US009237523B2

(12) United States Patent
Hsu et al.

(10) Patent No.: US 9,237,523 B2
(45) Date of Patent: Jan. 12, 2016

(54) METHOD OF ESTABLISHING SLEEP MODE OPERATION FOR BROADBAND WIRELESS COMMUNICATIONS SYSTEMS

(75) Inventors: Chung-Hsien Hsu, Taichung (TW); Yih-Shen Chen, Hsinchu (TW)

(73) Assignee: MEDIATEK INC. (TW)

( * ) Notice: Subject to any disclaimer, the term of this patent is extended or adjusted under 35 U.S.C. 154(b) by 1021 days.

(21) Appl. No.: 12/459,711

(22) Filed: Jul. 6, 2009

(65) Prior Publication Data

US 2010/0002612 A1  Jan. 7, 2010

Related U.S. Application Data

(60) Provisional application No. 61/078,523, filed on Jul. 7, 2008.

(51) Int. Cl.
*H04B 1/16* (2006.01)
*H04W 52/02* (2009.01)
*H04B 1/06* (2006.01)

(52) U.S. Cl.
CPC .................................. *H04W 52/0232* (2013.01)

(58) Field of Classification Search
USPC ............. 455/574, 343.1, 343.2, 343.3, 343.4; 370/232, 235
See application file for complete search history.

(56) References Cited

U.S. PATENT DOCUMENTS

| 6,735,454 | B1 * | 5/2004 | Yu et al. | 455/574 |
| 7,289,804 | B2 | 10/2007 | Kim | 455/432.1 |
| 7,986,652 | B1 * | 7/2011 | Hui et al. | 370/311 |
| 2002/0105906 | A1 * | 8/2002 | Marjelund et al. | 370/229 |
| 2003/0144020 | A1 | 7/2003 | Challa et al. | 455/522 |
| 2004/0042501 | A1 * | 3/2004 | Hester et al. | 370/509 |
| 2004/0095901 | A1 * | 5/2004 | Rajkotia | 370/328 |
| 2005/0070340 | A1 * | 3/2005 | Kim | 455/574 |
| 2005/0169201 | A1 * | 8/2005 | Huylebroeck | 370/311 |

(Continued)

FOREIGN PATENT DOCUMENTS

| CN | 101026837 A | 2/2007 |
| CN | 101026837 | 8/2007 |

(Continued)

OTHER PUBLICATIONS

Machine Translation of JP 2004187002 (procured Oct. 15, 2013).*

(Continued)

*Primary Examiner* — Lee Nguyen
(74) *Attorney, Agent, or Firm* — Imperium Patent Works; Zheng Jin; Helen Mao

(57) ABSTRACT

A method of establishing a sleep mode operation between a mobile station and its serving base station is provided in a wireless communications system. When sleep mode operation is active, the MS enters into a series of sleep cycle and each sleep cycle comprises a listening window followed by a sleep window. In one novel aspect, each sleep cycle is associated with a set of sleep cycle parameters including a Sleep Cycle Length and an adjustable Listening Window Length. Each set of sleep cycle parameters is determined based on a predefined traffic characteristic of a data communication flow between the MS and it serving BS. Different embodiments of sleep cycle parameters are provided for real-time traffic, non-real-time traffic, real-time and non-real-time mixed traffic, and multi-rate transmission traffic. By using sleep cycle-based parameters, the efficiency of sleep mode operation is improved.

19 Claims, 6 Drawing Sheets

(56) References Cited

U.S. PATENT DOCUMENTS

| | | | |
|---|---|---|---|
| 2007/0019574 A1* | 1/2007 | Huang | 370/310 |
| 2007/0218939 A1 | 9/2007 | Lim et al. | 455/528 |
| 2007/0242786 A1 | 10/2007 | Kim et al. | 375/354 |
| 2007/0286111 A1* | 12/2007 | Corson et al. | 370/319 |
| 2008/0009328 A1 | 1/2008 | Narasimha | 455/574 |
| 2008/0068217 A1* | 3/2008 | Van Wyk et al. | 340/870.11 |
| 2008/0075026 A1 | 3/2008 | Son et al. | 370/311 |
| 2008/0107056 A1* | 5/2008 | Choi et al. | 370/311 |
| 2009/0092075 A1* | 4/2009 | Corson et al. | 370/328 |
| 2009/0161587 A1* | 6/2009 | Ishii et al. | 370/311 |
| 2009/0201843 A1* | 8/2009 | Wang | 370/311 |
| 2011/0019555 A1* | 1/2011 | Gotoh et al. | 370/252 |
| 2011/0053657 A1* | 3/2011 | JI | 455/574 |
| 2012/0163193 A1 | 6/2012 | Ishii et al. | 370/242 |

FOREIGN PATENT DOCUMENTS

| | | | |
|---|---|---|---|
| EP | 1197101 A1 | 7/1999 | |
| JP | 2004187002 A * | 7/2004 | H04L 12/28 |
| JP | 2008517515 | 5/2008 | |
| WO | WO2006040769 | 4/2006 | |
| WO | WO2008060033 A1 | 11/2006 | |
| WO | WO2007049698 A1 | 5/2007 | |
| WO | WO 2007049698 A1 * | 5/2007 | |
| WO | WO2007111480 | 10/2007 | |
| WO | WO2007111941 A2 | 10/2007 | |
| WO | WO 2008/060033 | 5/2008 | |
| WO | WO2008057583 A2 | 5/2008 | |

OTHER PUBLICATIONS

International Search Report and Written Opinion of International Search Authority for PCT/CN2009/072676 dated Sep. 17, 2009 (9 pages).

English translation of JP OA for Japan patent application 2011-512822 dated Oct. 16, 2012(4 pages).

Japan Office Action of Japanese patent application 2011-512822 dated Jul. 16, 2013 (9 pages).

EPO, Search Report for the EP patent application 09793847.6 dated Oct. 20, 2015 (3 pages).

* cited by examiner

METHOD OF ESTABLISHING SLEEP MODE OPERATION FOR BROADBAND WIRELESS COMMUNICATIONS SYSTEMS

CROSS REFERENCE TO RELATED APPLICATIONS

This application claims priority under 35 U.S.C. §119 from U.S. Provisional Application No. 61/078,523, entitled "Power Saving Class for Broadband Wireless Access Systems," filed on Jul. 7, 2008, the subject matter of which is incorporated herein by reference.

TECHNICAL FIELD

The disclosed embodiments relate generally to wireless network communications, and, more particularly, to power saving class and sleep mode operation in wireless communications systems.

BACKGROUND

In wireless communications systems, a mobile station (MS) maintains communication with a serving base station (BS) in normal mode operation, during which the MS actively receives and transmits data packets. In order to minimize power consumption, the MS sometimes enters sleep mode operation, during which the MS conducts pre-negotiated periods of absent time from the serving BS air interface. Thus, in addition to minimize power consumption, sleep mode operation is also designed to reduce usage of the serving BS air interface resource, and to mimic certain desirable traffic characteristics. When sleep mode operation is active, a series of alternating listening windows followed by sleep windows are provided for the MS. In each listening window, the MS is expected to receive and transmit data packets as in normal mode operation. In each sleep window, the serving BS shall not transmit any data packets to the MS.

FIG. 1 (Prior Art) illustrates examples of sleep mode operation in an IEEE 802.16e wireless communications system. As illustrated in FIG. 1, three types of power saving classes (PSCs) are defined based on different traffic characteristics. For non-real-time variable rate (NRT-VR) traffic and best effort (BE) traffic, a PSC of type I is defined. In type I PSC, the MS is provided with a fixed listening window length for monitoring incoming protocol data units (PDUs). The MS starts with an Initial Sleep Window Length $T_{MIN}$ ($S_0=T_{MIN}$), and each subsequent sleep window $S_k$ grows exponentially until reaching a Final Sleep Window Length $T_{MAX}$ ($S_k=\min\{T_{MIN}*2^k, T_{MAX}\}$). When a traffic indication message indicates positive traffic or when there are incoming PDUs in a subsequent listening window, the MS goes back to normal mode operation. For real-time variable rate (RT-VR) traffic and unsolicited grant service (UGS) traffic, a PSC of type II is defined. In type II PSC, each sleep window has a fixed length ($S_k=S_0$). For multicast or management traffic, a PSC of type III is defined. In type III PSC, the MS enters one fixed-length sleep window ($S_0$=final sleep window) to process the multicast or management traffic and then goes back to normal mode operation.

FIG. 2 (Prior Art) illustrates a problem of power waste under PSC of type I for NRT-VR/BE traffic. In the example of FIG. 2, variable-sized data bursts are generated with variable arrival intervals from the serving BS. The MS goes back to normal mode operation when the traffic indication message indicates positive traffic. The length of sleep window is reset to the Initial Sleep Window Length when sleep mode operation is reactivated. For NRT-VR/BE services, there generally would be long silence time between two successive data bursts. However, because the length of the sleep window is reset to the Initial Sleep Window Length, the MS unnecessarily wakes up during the long silence and extra power is wasted.

FIG. 3 (Prior Art) illustrates a problem of power waste under PSC of type II for RT-VR traffic. In the example of FIG. 3, each listening window has a fixed length. For RT-VR traffic, variable-sized data bursts are generated periodically with fixed arrival interval from the serving BS. Because each listening window has a fixed length, the MS keeps monitoring incoming PDUs even when no data packets are being received. Thus, the fixed listening window length approach is inefficient and extra power is wasted.

FIG. 4 (Prior Art) illustrates a problem of unnecessary latency under modified version of PSC of type II for RT-VR traffic. In the example of FIG. 4, each listening window has an adjustable length, but each sleep window has a fixed length. For RT-VR traffic, variable-sized data bursts are generated periodically with fixed arrival interval from the serving BS. If the incoming PDUs arrive at a time that the MS is sleeping, then the MS has to wait for the next listening window to receive the PDUs. Thus, because each sleep window has a fixed length, unnecessary latency is introduced.

Various solutions have been sought to solve the problems of the above-described sleep window-based sleep mode operation. In U.S. Pat. No. 7,289,804, the length of each initial sleep window is not fixed, but instead changes based on a counter for each sleep mode. In US patent publication 2008/0009328, the length of each sleep window grows exponentially, with additional parameters such as a sleep mode ratio to modify the speed of the growth. In US patent publication 2008/0075026, the length of a listening window can be extended according to a data reception timer. In LTE systems (e.g. 3GPP TS 36.321), a fixed DRX cycle is applied with adjustable On-duration time. These solutions have not eliminated the above-described energy waste and latency problems. In addition, the current PSC mechanism is unsuitable for the application for multi-rate traffic transmission. A solution is sought.

SUMMARY

A method of establishing a sleep mode operation between a mobile station and its serving base station is provided in a wireless communications system. When sleep mode operation is active, the MS enters into a series of sleep cycle and each sleep cycle comprises a listening window followed by a sleep window. In one novel aspect, each sleep cycle is associated with a set of sleep cycle parameters including a Sleep Cycle Length and an adjustable Listening Window Length. Each set of sleep cycle parameters is determined based on a predefined traffic characteristic of a data communication flow between the MS and it serving BS. Different embodiments of sleep cycle parameters are provided for real-time traffic, non-real-time traffic, real-time and non-real-time mixed traffic, and multi-rate transmission traffic. By using sleep cycle-based parameters instead of sleep window-based parameters, traffic characteristics are better mimicked, base station air interface resource is reduced, mobile station power usage is minimized, and the overall efficiency of sleep mode operation is improved.

In one embodiment, each sleep cycle has a fixed Sleep Cycle Length with an adjustable Listening Window Length for real-time traffic or a mixture of real-time and non-real-time traffic. The Listening Window Length has a fixed default value, but is dynamically adjustable for the purpose of data transportation and MAC control signaling transmission. The length of a listening window may be adjusted via implicit or explicit means. The MS may also terminate a listening window on reception of a control signal from its serving BS.

In another embodiment for non real-time traffic or best effort traffic, the MS enters into sleep mode operation with an Initial Sleep Cycle (ISC) Length, and each sleep cycle grows exponentially until reaching a Final Sleep Cycle Length if a traffic indication message is negative or if there is no data traffic during the previous listening window. The Listening Window Length may be fixed for receiving the traffic indication message. The Listening Window Length may also vary for variable-length data transmission. If the traffic indication message is positive or if there is data traffic during the previous listening window, then the length of the sleep cycle is reset to a new Initial Sleep Cycle. In one example, the new ISC is equal to the old ISC plus a Sleep Offset. In another example, the new ISC is equal to a fraction of the last Sleep Cycle Length.

In yet another embodiment, multiple sets of sleep cycle parameters are applied for multi-rate transmission traffic. Each set of sleep cycle parameters is associated with a sleep cycle ID (SCID), which is associated with a fixed Sleep Cycle Length and an adjustable Listening Window Length. In one example of VoIP traffic with silence suppression, a first SCID with a shorter Sleep Cycle Length is applied during active talking period, and a second SCID with a longer Sleep Cycle Length is applied during silence period. The alternation between different SCIDs can be implemented either implicitly or explicitly.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
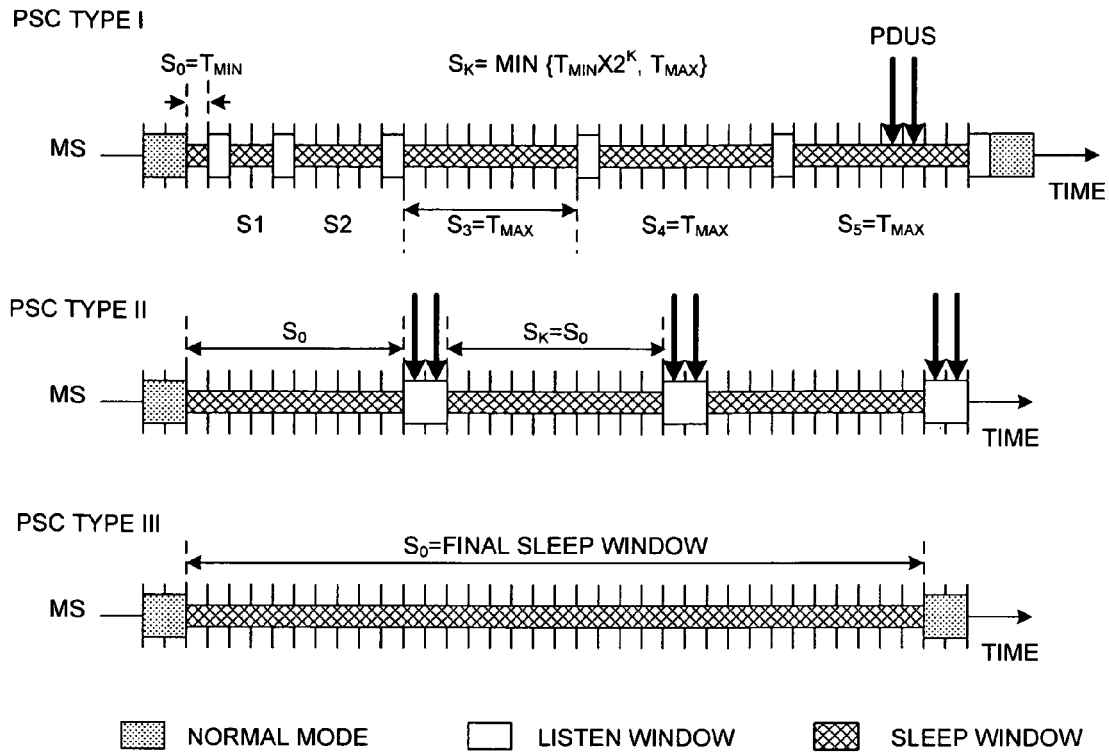
FIG. 1 (Prior Art) illustrates sleep mode operations in an IEEE 802.16e wireless communications system.
Figure 2:
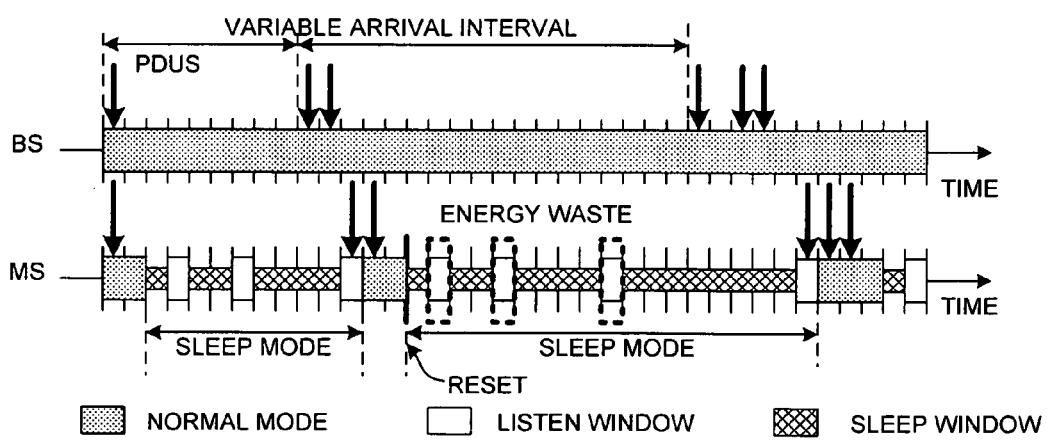
FIG. 2 (Prior Art) illustrates a problem of power waste under PSC of type I for NRT-VR traffic.
Figure 3:
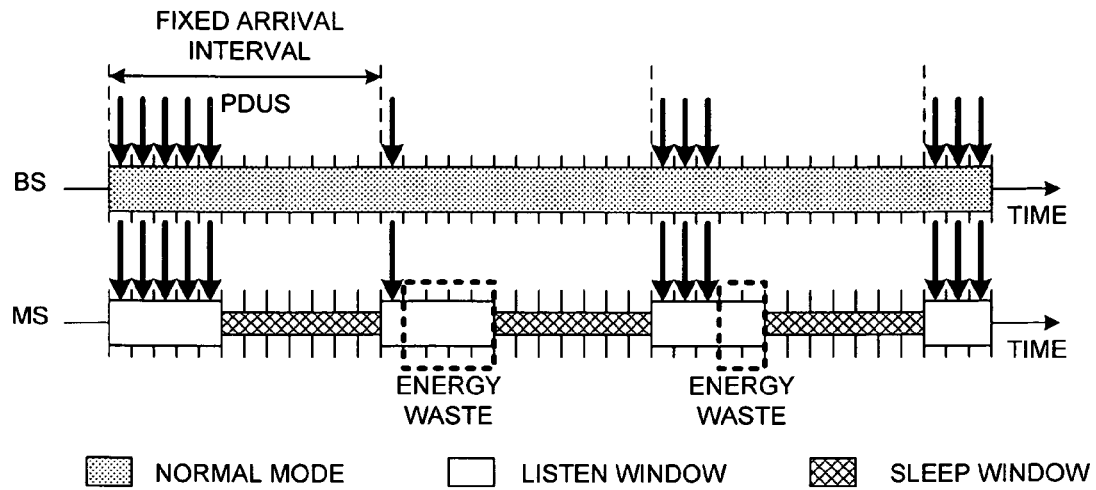
FIG. 3 (Prior Art) illustrates a problem of power waste under PSC of type II for RT-VR traffic.
Figure 4:
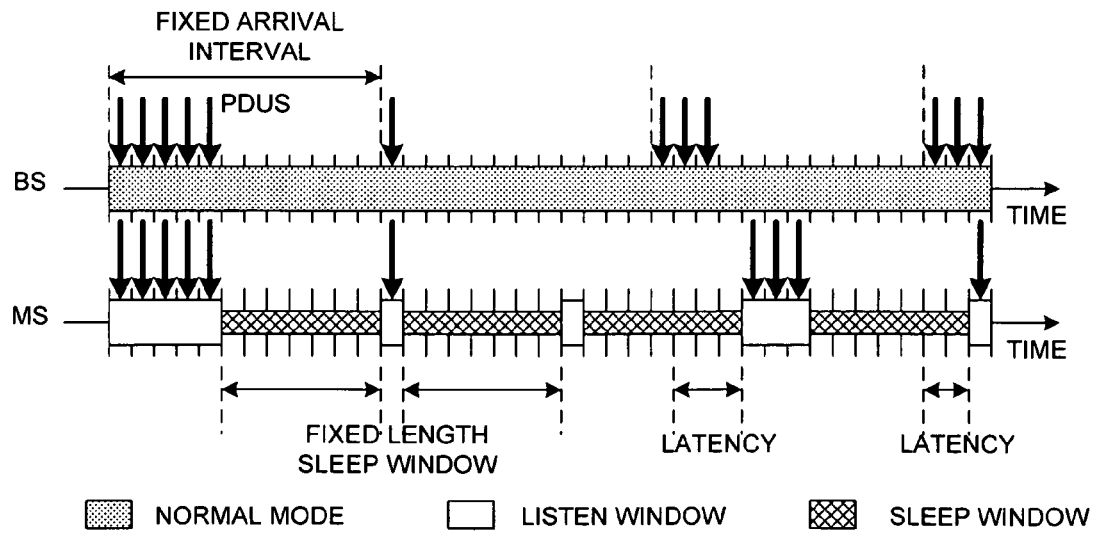
FIG. 4 (Prior Art) illustrates a problem of unnecessary latency under PSC of type II for RT-VR traffic.
Figure 5:
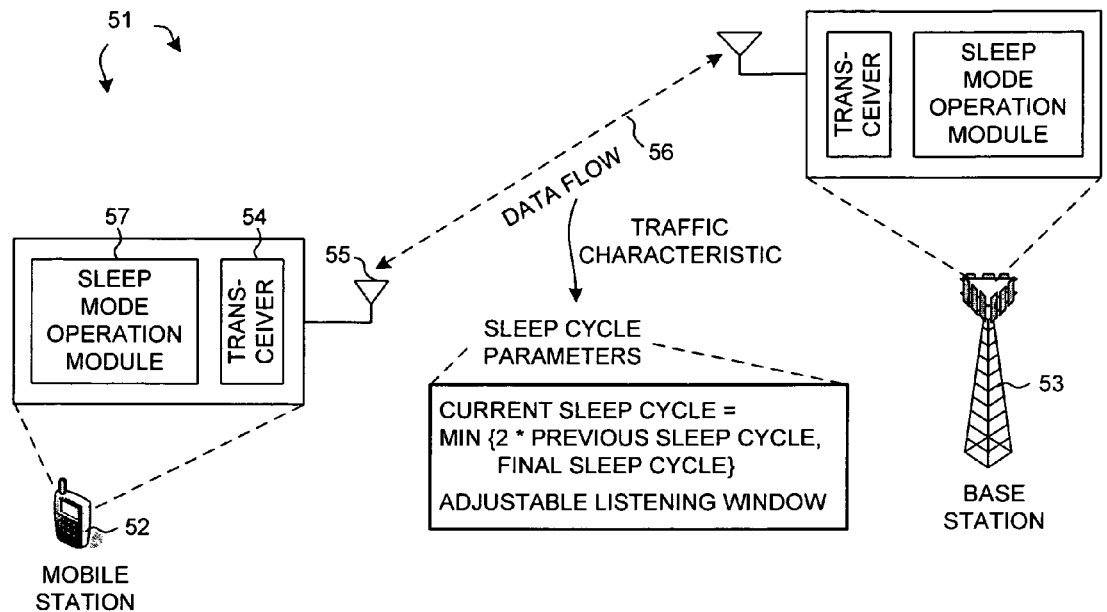
FIG. 5 is a high-level block diagram of a wireless communications system in accordance with one novel aspect.

FIG. 5 is a high-level block diagram of a wireless communications system 51 in accordance with one novel aspect. Wireless system 51 includes a mobile station MS52 and a serving base station BS53. MS52 comprises a transceiver 54 coupled to an antenna 55 that communicates data with serving BS53 via a data communication flow 56. During normal mode operation, MS52 actively transmits and receives data packets whenever necessary. MS52 also comprises a sleep mode operation module 57 that negotiates sleep mode operation parameters with serving BS53. When sleep mode is active, MS52 enters into a series of sleep cycles and each sleep cycle comprises a listening window followed by a sleep window. During each listening window in sleep mode, MS52 receives all downlink transmissions the same way as in the state of normal mode operation. During each sleep window in sleep mode, serving BS53 does not autonomously transmit to MS52, and MS52 may power down one or more physical operation components or perform other activities such as scanning.

In one novel aspect, each sleep cycle is associated with a set of sleep cycle parameters, which is determined based on a predefined traffic characteristic of data flow 56 between MS52 and serving BS53. Each set of sleep cycle parameters consists of two main parameters: a Sleep Cycle Length and a Listening Window Length. As a general rule, MS52 and BS53 update the length of each sleep cycle as follows: Current Sleep Cycle=min {2*Previous Sleep Cycle, Final Sleep Cycle}. The length of listening windows may also be dynamically adjusted. In addition, each set of sleep cycle parameters may consist parameters such as Initial Sleep Cycle Length, Final Sleep Cycle Length, Sleep Offset and/or Reduction Ratio, each parameter will be described below with more details.

Figure 6:
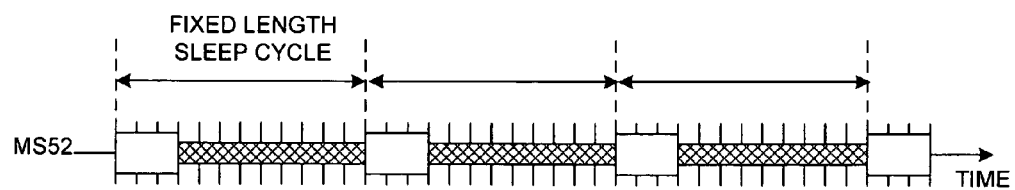
FIG. 6 illustrates two embodiments of sleep mode operation for real-time traffic in a wireless system.
Figure 6:
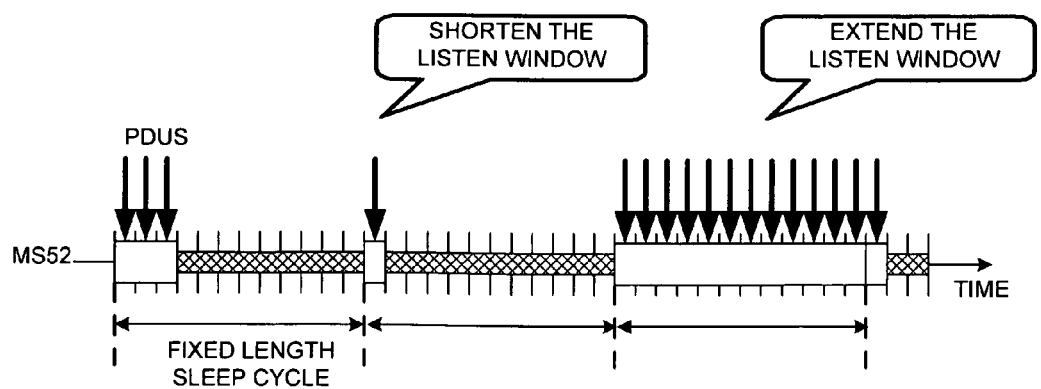

FIG. 6 illustrates two embodiments of sleep mode operation for real-time traffic in wireless system 51. In a first embodiment, as illustrated in the top portion of FIG. 6, real-time traffic is communicated between MS52 and serving BS53. In general, real-time applications generate periodic data bursts with fixed arrival interval. Thus, each sleep cycle has a fixed Sleep Cycle Length to mimic such traffic characteristic. Under fixed Sleep Cycle Length sleep mode operation, the Final Sleep Cycle Length is equal to the Initial Sleep Cycle Length, which is based on the fixed arrival interval of the real-time traffic. In accordance with one novel aspect, instead of using sleep window-based parameters (such as Sleep Window Length), sleep cycle-based parameters (such as Sleep Cycle Length) are used to better mimic real-time traffic characteristic and thereby improve efficiency of the sleep mode operation for real-time traffic. MS52 is thus able to receive and process periodic incoming data packets without causing unnecessary latency even if each listening window is dynamically adjustable.

In a second embodiment, as illustrated in the bottom portion of FIG. 6, real-time variable rate (RT-VR) traffic is communicated between MS52 and serving BS53. In general, real-time applications with variable bit rates generate variable-sized data bursts with fixed arrival interval. Thus, each sleep cycle has a fixed Sleep Cycle Length with adjustable Listening Window Length. The Listening Window Length has a fixed default value, but is dynamically adjustable for the purpose of data transportation and MAC control signaling transmission. As illustrated in FIG. 6, the length of a listening window is shortened when there are less protocol data units (PDUs) to be received, and is extended when there are more PDUs to be received. The length of a listening window may be adjusted via implicit or explicit means. In a first example, a MAC header or a MAC message can be used to indicate the end of a burst of data packets; in a second example, a MAC header or a MAC message can be used to indicate explicitly whether to shorten or extend a listening window. MS52 may also terminate a listening window on reception of a control signal from serving BS53. In accordance with one novel aspect, by adjusting the length of each listening window based on the actual variable rate of RT-VR traffic, MS52 is able to stay in sleep window as long as possible to minimize energy waste, or stay in the listening window as long as possible to reduce data transmission latency. This sleep mode operation for RT-VR traffic is also suitable for a mixture of real-time (RT) traffic and non-real-time (NRT) traffic scenario.

Figure 7:
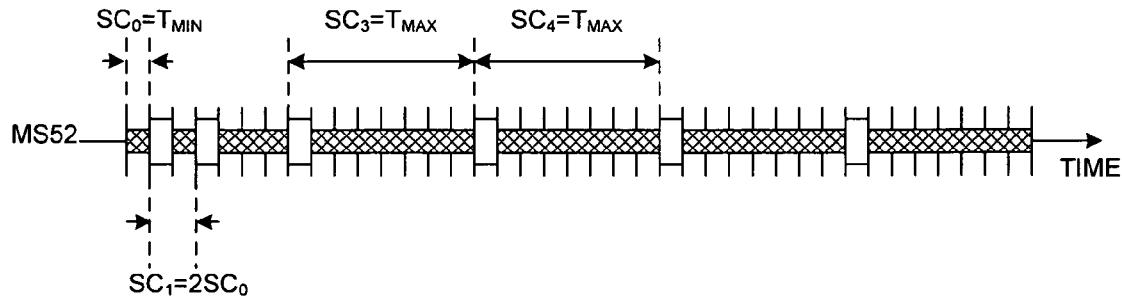
FIG. 7 illustrates one embodiment of sleep mode operation for non-real-time traffic in a wireless system.

FIG. 7 illustrates one embodiment of sleep mode operation for non-real-time traffic in wireless system 51. In general, non-real-time applications generate variable-sized data bursts with variable arrival intervals. Thus, to mimic such traffic characteristic, the first sleep cycle starts with a minimum Initial Sleep Cycle Length $T_{MIN}$ ($SC_0 = T_{MIN}$), and each subsequent sleep cycle $SC_k$ grows exponentially until reaching a maximum Final Sleep Cycle Length $T_{MAX}$ ($SC_k = \min\{T_{MIN}*2^k, T_{MAX}\}$) if a traffic indication message is negative or if there is no data traffic during the previous listening window. In the example of FIG. 7, the second sleep cycle $SC_1 = 2SC_0$, the third sleep cycle $SC_2 = 2SC_1$, and all subsequent sleep cycles ($SC_3$, $SC_4$ and so on) have a sleep cycle length that is equal to the maximum Final Sleep Cycle Length $T_{MAX}$. Under this sleep mode operation for non-real-time traffic, the Listening Window Length is also adjustable. In one example, each listening window has a fixed length for MS52 to receive the traffic indication message. In another example, variable-length listening window is negotiated between MS52 and BS53 for variable-length data transmission. The above-illustrated sleep mode operation for non-real-time (NRT) traffic is also suitable for best effort (BE) traffic scenario.

Figure 8:
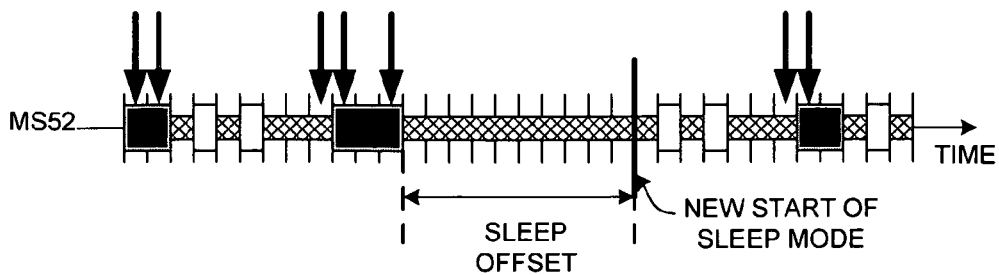
FIG. 8 illustrates an embodiment of sleep mode operation with sleep offset for non-real-time traffic in a wireless system.

FIG. 8 illustrates an embodiment of sleep mode operation with Sleep Offset for non-real-time traffic in wireless system 51. As illustrated in FIG. 8, non-real-time traffic with variable-sized data bursts and variable arrival intervals is communicated between MS52 and serving BS53. If the traffic indication message is positive or if there is data traffic during the previous listening window, then the length of the sleep cycle is reset to a new Initial Sleep Cycle. In accordance with one novel aspect, the new Initial Sleep Cycle is adjustable. In one example, as illustrated in FIG. 8, the new ISC is equal to the old ISC plus a Sleep Offset (New ISC=Old ISC+Sleep Offset). The Sleep Offset may be decided by statistic methods (e.g., mean session arrival time). For non-real-time traffic such as data packets from a web browsing application, there generally would be long silence time (e.g., reading time) between two successive data streams. Thus, by adding a Sleep Offset, MS52 does not need to wake up unnecessarily during the long reading time and energy waste is reduced. In another example, the new SIC is equal to a fraction of the last Sleep Cycle Length (New ISC=1/N*last Sleep Cycle), where N is referred as Reduction Ratio, a configurable parameter conveyed from BS53 to MS52.

Figure 9:
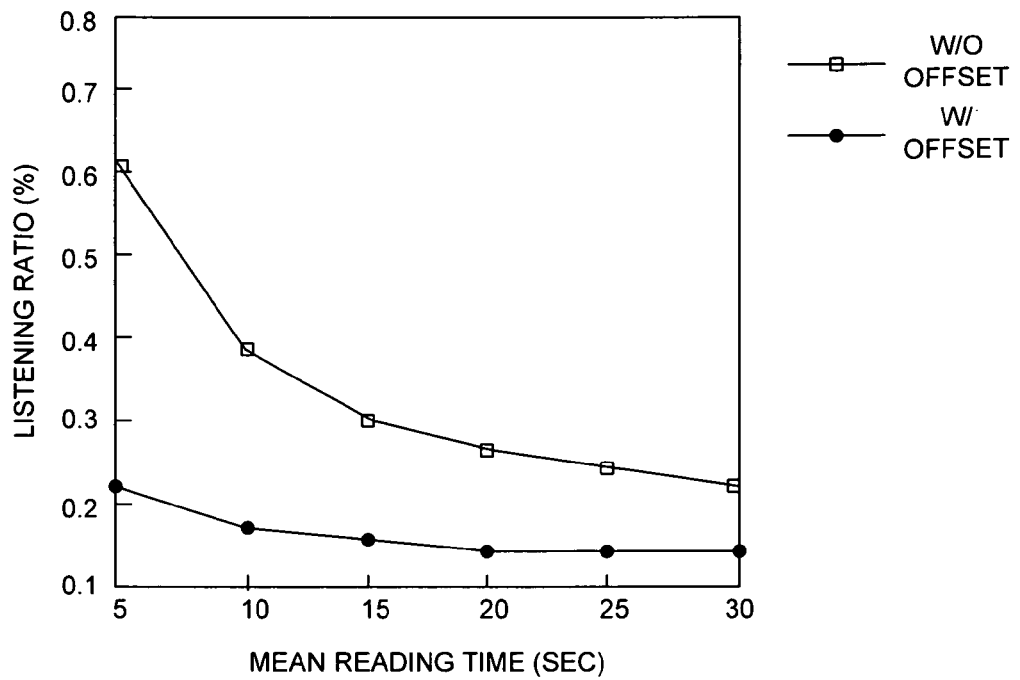
FIG. 9 is a simulation diagram of listening ratio under different mean reading time with and without sleep offset.

FIG. 9 is a simulation diagram of listening ratio under different mean reading time with and without sleep offset. The horizontal axis represents the mean reading time of non-real-time traffic such as data packets from a web browsing application, and the vertical axis represents listening ratio percentage. As illustrated in FIG. 9, the listening ratio without sleep offset is higher than the listening ratio with sleep offset. This simulation result demonstrates that the use of sleep offset reduces the listening ratio and power consumption and thus improves the efficiency of the sleep mode operation.

Figure 10:
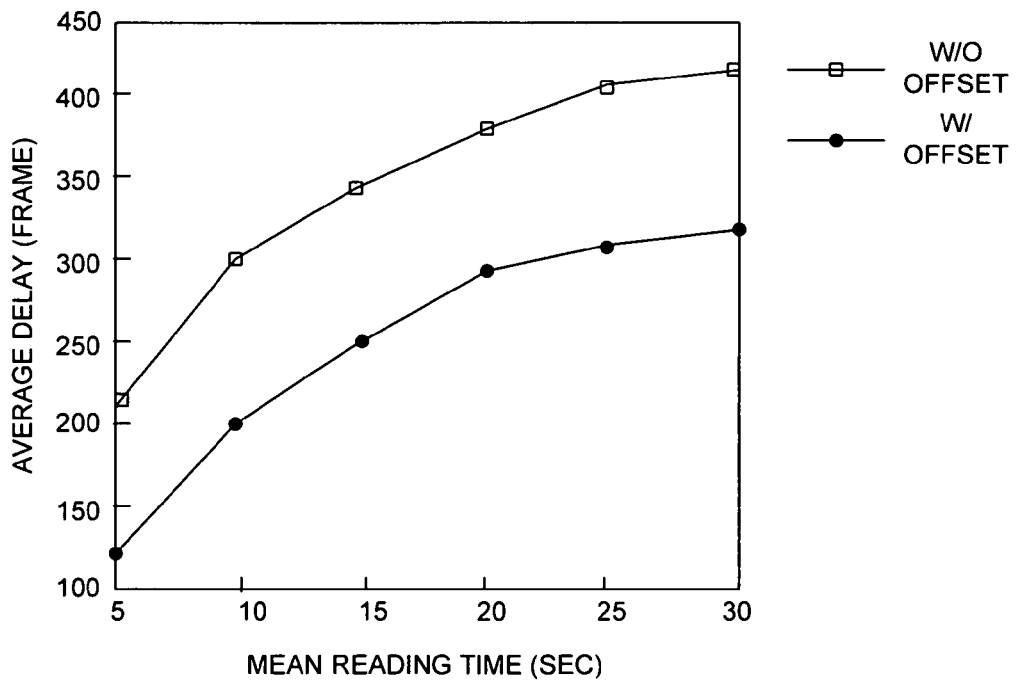
FIG. 10 is a simulation diagram of average delay under different mean reading time with and without sleep offset.

FIG. 10 is a simulation diagram of average delay under different mean reading time with and without sleep offset. The horizontal axis represents the mean reading time of non-real-time traffic such as data packets from a web browsing application, and the vertical axis represents average delay. As illustrated in FIG. 10, the average delay without sleep offset is higher than the average delay with sleep offset. This simulation result demonstrates that the use of sleep offset reduces the average latency and thus improves the efficiency of data transmission during the sleep mode operation.

Figure 11:
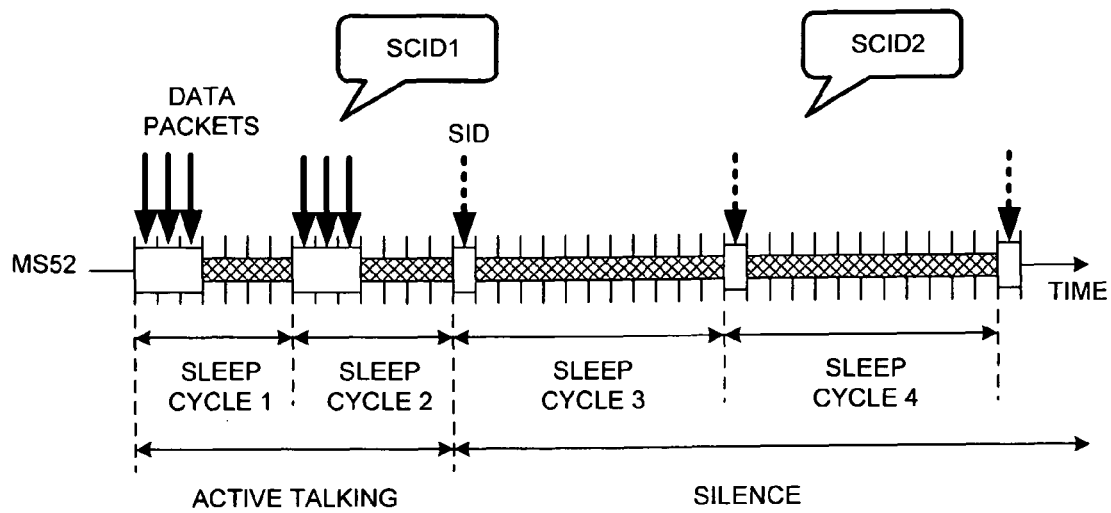
FIG. 11 illustrates one embodiment of sleep mode operation for multi-rate traffic.

FIG. 11 illustrates one embodiment of sleep mode operation for multi-rate traffic in wireless system 51. Multi-rate traffic comprises data traffic with different characteristics and different rates. In one novel aspect, multiple sets of sleep cycle parameters are applied to multiple traffic rates of the same data transmission traffic. In general, if there are N different traffic rates in the multi-rate traffic flow, then N different sets of sleep cycle parameters can be applied to the N different traffic rates respectively. MS52 negotiates with its serving BS53, and applies different sets of sleep cycle parameters when the characteristic of the current data transmission traffic is changed.

As illustrated in FIG. 11, each set of sleep cycle parameters is associated with a sleep cycle ID (SCID), which is associated with a fixed Sleep Cycle Length and an adjustable Listening Window Length. Multiple SCIDs are assigned for MS52 to support multi-rate transmission. For example, in voice over IP (VoIP) with silence suppression type of applications, a first SCID1 having 20 milliseconds Sleep Cycle Length is applied to sleep cycle 1 and sleep cycle 2 during active talking period (normal mode); and a second SCID2 having 160 milliseconds Sleep Cycle Length is applied to sleep cycle 3 and sleep cycle 4 during silence period (silence suppression mode). For SCID1, a shorter Sleep Cycle Length of 20 milliseconds is applied for MS52 to handle data packets that have a shorter arrival interval during active talking. In addition, each listening window can be adjusted to have a relatively longer Listening Window Length for the MS to receive more incoming data packets. On the other hand, for SCID2, a longer Sleep Cycle Length of 160 milliseconds is applied during silence, and each listening window can be adjusted to have a relatively shorter Listening Window Length for receiving the silence insertion descriptor (SID).

Figure 12:
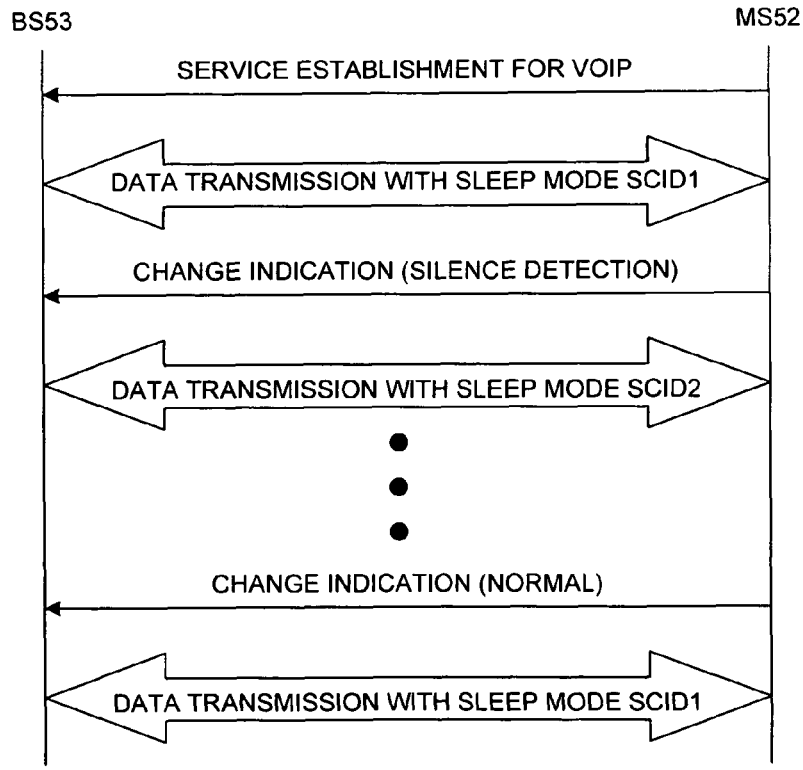
FIG. 12 illustrates one embodiment of sleep mode operation for voice over IP with silence suppression.

FIG. 12 illustrates one embodiment of sleep mode operation for voice over IP traffic with silence suppression between MS52 and its serving BS53. In the example of FIG. 12, a silence-suppression enabled VoIP multi-rate traffic is established between MS52 and BS53. Initially, MS52 enters sleep mode operation with a first SCID1 for active talking period (normal mode). When MS52 detects silence, it sends an uplink indication message to its serving BS53 indicating that a second SCID2 is going to be applied for silence period (silence suppression mode). Later on, when MS52 detects talking, it sends another uplink indication message to its serving BS53 indicating that MS52 switches back to sleep mode operation with SCID1. MS52 thus alternates SCID1 and SCID2 when the status of current traffic flow is changed.

The alternation between different SCIDs can be implemented either implicitly or explicitly. Implicitly, if traffic characteristics and quality of service (QoS) parameters change, then SCIDs can be altered accordingly. In one example, the mobile station or its serving base station can detect the change of traffic characteristic by not receiving any voice packets in multiple successive listening windows. In another example, the mobile station or its serving base station sends out a signal to indicate the change of traffic characteristics or QoS parameters, and the alternation of sleep cycle parameters is implicitly done upon the reception of the signal. The SCID parameters may be applied in consistent with certain QoS parameters such as Primary Grant and Polling Interval and Primary Grant Size. Explicitly, a MAC management message can be used by either the mobile station or its serving base station to indicate the SCID alternation.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method of establishing a sleep mode operation between a mobile station and a serving base station in a wireless communications system, the sleep mode comprises a plurality of sleep cycles, the method comprising:
   (a) determining a predefined traffic characteristic of a data transmission traffic flow between the mobile station and the serving base station, wherein the data transmission traffic flow is a multi-rate traffic flow that comprises data traffic with different characteristics and different traffic rates; and
   (b) applying one or multiple sets of sleep cycle parameters to each sleep cycle based on the determined traffic characteristic, wherein each sleep cycle comprises a sleep window and a listening window, wherein each set of sleep cycle parameters comprises a sleep cycle length and a listening window length, wherein a first set of sleep cycle parameters is applied when the determined traffic characteristic of the data transmission traffic flow has a first traffic rate, and wherein a second set of sleep cycle parameters is applied when the determined traffic characteristic of the same data transmission traffic flow is changed to a second traffic rate.

2. The method of claim 1, further comprising:
   (c) modifying the listening window length when an end of a burst of data packets is indicated by either a MAC header or a MAC message.

3. The method of claim 2, wherein one of the listening windows is terminated when indicated by either a MAC header or a MAC message.

4. The method of claim 3, wherein the terminating of said one of the listening windows involves receiving a MAC header during said one listening window and in response to the receiving of the MAC header terminating said listening window, wherein the MAC header indicates an end of a burst of data packets.

5. The method of claim 2, wherein the modifying of (c) involves receiving a MAC message during a listening window and in response to the MAC message terminating the listening window, wherein the MAC message indicates the end of the burst of data packets.

6. The method of claim 1, wherein the multi-rate traffic is voice-over-IP having active talking period and silence period, and wherein the first set of sleep cycle parameters comprises shorter sleep cycle length for active talking period, and wherein the second set of sleep cycle parameters comprises longer sleep cycle length for silence period.

7. The method of claim 1, wherein each sleep cycle is associated with one sleep cycle ID having a set of sleep cycle parameters, and wherein a different sleep cycle ID is assigned to a different traffic rate of the multi-rate traffic.

8. A method of establishing a sleep mode operation between a mobile station and a serving base station in a wireless communications system, the sleep mode comprises a plurality of sleep cycles, the method comprising:
   (a) determining a predefined traffic characteristic of a data transmission flow between the mobile station and the serving base station; and
   (b) applying a set of sleep cycle parameters to each sleep cycle based on the determined traffic characteristic, wherein each sleep cycle comprises a sleep window and a listening window, wherein the set of sleep cycle parameters comprises a sleep cycle length and a listening window length, wherein the traffic characteristic is non-real-time traffic, wherein the sleep mode starts with an original initial sleep cycle length, and wherein each sleep cycle length grows exponentially up to a final sleep cycle length when no data traffic is indicated by a traffic indication message, wherein each listening window length is adjustable for receiving variable-length data transmission.

9. The method of claim 8, wherein a new initial sleep cycle length is re-determined when the traffic indication message indicates positive data traffic.

10. The method of claim 9, wherein the new initial sleep cycle length is equal to the original initial sleep cycle length plus a sleep offset.

11. The method of claim 10, wherein the sleep offset is based on mean session arrival time.

12. The method of claim 9, wherein the new initial sleep cycle length is equal to a fraction of the previous sleep cycle length.

13. A mobile station comprising:
   a transceiver that communicates with a base station via a data transmission traffic flow having predefined traffic characteristics, wherein the data transmission traffic flow is a multi-rate traffic flow that comprises data traffic with different characteristics and different traffic rates;
   a sleep mode operation module that establishes a sleep mode operation having a plurality of sleep cycles, the sleep mode operation module applies multiple sets of sleep cycle parameters to the plurality of sleep cycles based on a determined traffic characteristic of the data transmission traffic flow, wherein each sleep cycle comprises a sleep window and a listening window, wherein each set of sleep cycle parameters comprises a sleep cycle length and a listening window length, wherein a first set of sleep cycle parameters is applied when the determined traffic characteristic of the data transmission traffic flow has a first traffic rate, and wherein a second set of sleep cycle parameters is applied when the determined traffic characteristic of the same data transmission traffic flow is changed to a second traffic rate.

14. The mobile station of claim 13, wherein the multi-rate traffic is voice-over-IP having active talking period and silence period, and wherein the first set of sleep cycle parameters comprises shorter sleep cycle length for active talking period, and wherein the second set of sleep cycle parameters comprises longer sleep cycle length for silence period.

15. The mobile station of claim 13, wherein each sleep cycle is associated with one sleep cycle ID having a set of sleep cycle parameters, and wherein a different sleep cycle ID is assigned to a different traffic rate of the multi-rate traffic.

16. The mobile station of claim 13, wherein the sleep mode operation module modifies the listening window length when an end of a burst of data packets is indicated by either a MAC header or a MAC message.

17. The mobile station of claim 16, wherein the listen window length is modified via receiving a MAC message during a listening window and in response to the MAC message terminating the listening window, wherein the MAC message indicates the end of the burst of data packets.

18. The mobile station of claim 16, wherein one of the listening windows is terminated when indicated by either a MAC header or a MAC message.

19. The mobile station of claim 18, wherein the terminating of said one of the listening windows involves receiving a MAC header during said one listening window and in response to the receiving of the MAC header terminating said listening window, wherein the MAC header indicates an end of a burst of data packets.

* * * * *